US009240661B2

(12) United States Patent
Bainbridge

(10) Patent No.: US 9,240,661 B2
(45) Date of Patent: Jan. 19, 2016

(54) APPARATUS FOR FEEDING CRIMP TERMINALS ON A CARRIER STRIP INTO A CRIMPING PRESS

(75) Inventor: Andy Bainbridge, Greater Manchester (GB)

(73) Assignee: CIRCUITMASTER DESIGNS LIMITED, Lancashire (GB)

( * ) Notice: Subject to any disclaimer, the term of this patent is extended or adjusted under 35 U.S.C. 154(b) by 601 days.

(21) Appl. No.: 13/636,986

(22) PCT Filed: Mar. 14, 2011

(86) PCT No.: PCT/GB2011/050495

§ 371 (c)(1),
(2), (4) Date: Nov. 20, 2012

(87) PCT Pub. No.: WO2011/117604

PCT Pub. Date: Sep. 29, 2011

(65) Prior Publication Data

US 2013/0063591 A1 Mar. 14, 2013

(30) Foreign Application Priority Data

Mar. 23, 2010 (GB) .................................. 1004815.5

(51) Int. Cl.
*B23P 19/00* (2006.01)
*H01R 43/042* (2006.01)
*H01R 43/055* (2006.01)

(52) U.S. Cl.
CPC ......... *H01R 43/055* (2013.01); *Y10T 29/49185* (2015.01); *Y10T 29/53235* (2015.01); *Y10T 29/53261* (2015.01)

(58) Field of Classification Search
CPC ............... H01R 43/048; H01R 43/055; Y10T 29/49185; Y10T 29/53235; Y10T 29/53091; Y10T 29/53261
USPC .............. 29/753, 721, 759, 863; 348/86, 125, 348/135, E7.085; 356/237.2, 628
See application file for complete search history.

(56) References Cited

U.S. PATENT DOCUMENTS

| | | | | |
|---|---|---|---|---|
| 4,649,621 A | | 3/1987 | Dusel et al. | |
| 5,619,792 A | * | 4/1997 | Ohmori | G01B 11/00 29/721 |

(Continued)

FOREIGN PATENT DOCUMENTS

| | | | |
|---|---|---|---|
| EP | 1056167 A2 | 4/2007 | |
| JP | 2002025741 A1 | 1/2002 | |

(Continued)

OTHER PUBLICATIONS

English language abstract and translation for JP 2002-025741 extracted from the PAJ database on Oct. 11, 2012, 24 pages.

(Continued)

*Primary Examiner* — Thiem Phan

(74) *Attorney, Agent, or Firm* — Howard & Howard Attorneys PLLC

(57) ABSTRACT

An apparatus comprising a feeding mechanism for displacing the carrier strip along a feed path; an image capture means adapted to capture an image of a portion of the feed path; and, an image processing means connected to the image capture means and being adapted to (a) determine the position of at least one terminal on the feed path from the image; (b) determine the pitch of the strip either from the image or from a pre-stored value; and, (c) calculate an alignment displacement of the strip along the feed path from the position and pitch such that a further terminal on the strip lies within a crimping zone on the feed path; the image processing means being connected to the feeding mechanism and adapted to provide a control signal thereto such that the feeding mechanism displaces the carrier strip along the feed path by the alignment displacement.

14 Claims, 3 Drawing Sheets

(56) References Cited

U.S. PATENT DOCUMENTS

Figure 1:
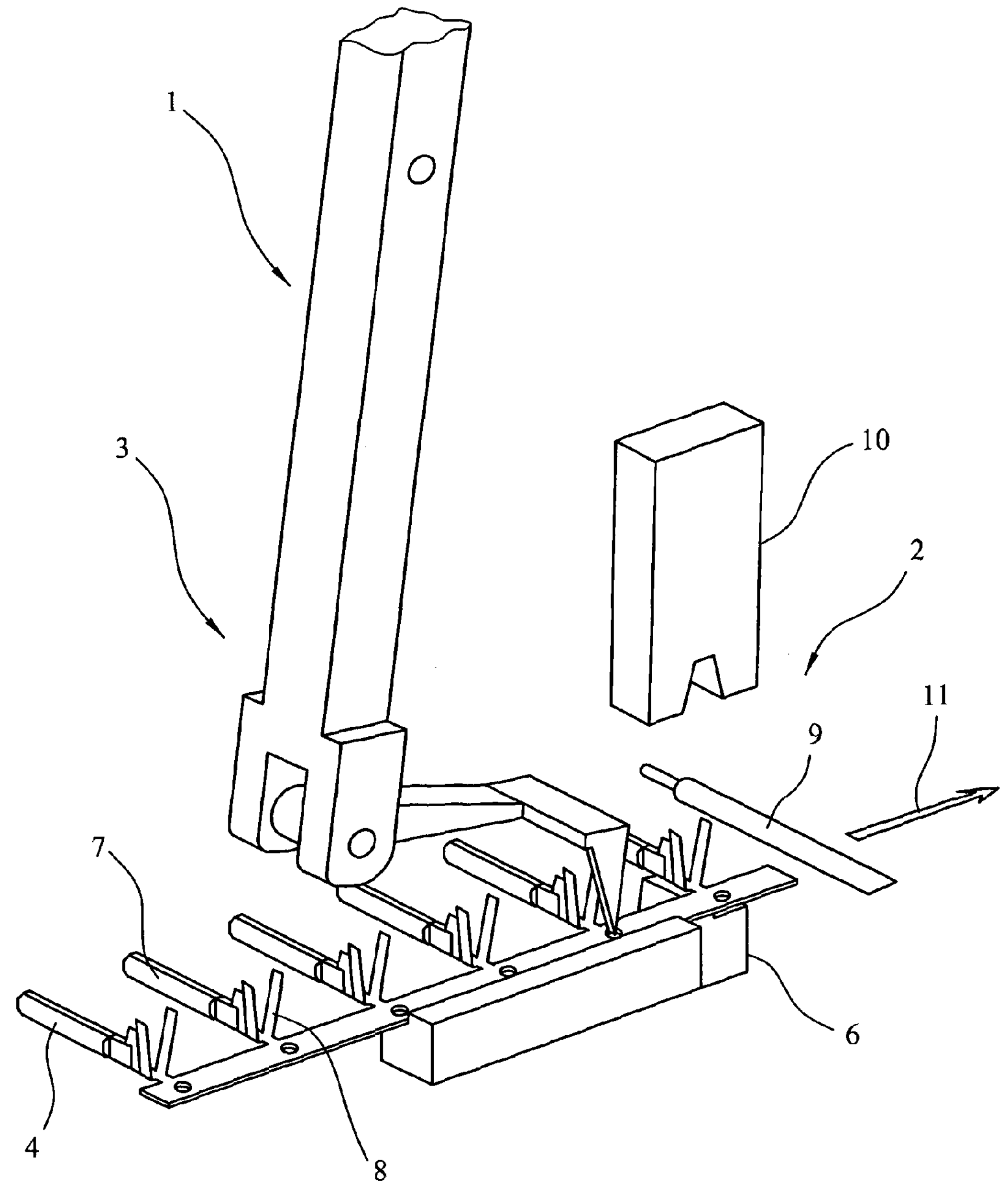

| | | | | |
|---|---|---|---|---|
| 6,738,134 | B2 * | 5/2004 | Maeda | G01N 21/8806 313/364 |
| 2007/0079501 | A1 | 4/2007 | Garner | |

FOREIGN PATENT DOCUMENTS

| | | | | |
|---|---|---|---|---|
| JP | 2005216717 | | * | 8/2005 |
| WO | WO 2007005433 | A1 | | 1/2007 |
| WO | WO 2009059769 | A1 | | 5/2009 |
| WO | WO 2009117789 | A2 | | 10/2009 |

OTHER PUBLICATIONS

International Search Report for Application No. PCT/GB2011/050495 dated Jul. 25, 2011, 3 pages.

* cited by examiner

APPARATUS FOR FEEDING CRIMP TERMINALS ON A CARRIER STRIP INTO A CRIMPING PRESS

CROSS-REFERENCE TO RELATED APPLICATIONS

The subject patent application claims priority to and all the benefits of International Patent Application No. PCT/GB2011/050495 filed on Mar. 14, 2011 with the World Intellectual Property Organization, which claims priority to Great Britain Patent Application No. 1004815.5 filed on Mar. 23, 2010, both of which are incorporated herein by reference.

The present invention relates to an apparatus and method for feeding crimp terminals on a carrier strip into a crimping press. More particularly, but not exclusively, the present invention relates to an apparatus for feeding terminals into a crimping press, the apparatus being adapted to capture an image of at least one terminal and then using the measured position of the terminal and the pitch of the carrier strip, displacing the strip so that a further terminal on the strip lies within a crimping zone.

Apparatus for feeding a carrier strip into a crimping press are known. These are typically mechanical methods whereby guiding fingers or grooves are used to guide the terminals into a crimping press where the terminals are crimped into contact with wires. Such mechanical devices are typically not able to handle strips of different pitch or different types of terminals. Typically different feeding assemblies must be used for each type of strip.

It is known to use a light beam to measure the position of a terminal before it reaches the crimping press. When the light beam is broken the terminal is in the correct position. If the light beam is the correct distance from the crimping press then a terminal further along the carrier strip is correctly arranged within a crimping zone where it can be crimped by the crimping press. If a strip of a different pitch is used however then when the light beam is broken by a terminal the terminal further along the strip will not be correctly aligned in the crimping zone. Each time a strip of a different pitch is used it is necessary to move the position of the beam along the feed path to allow for the difference in pitch. This can be time consuming. Also, since the alignment of the terminal with the press must often be accurate to within a small fraction of a millimeter it can be difficult to achieve.

The apparatus according to the invention seeks to overcome the problems of the prior art.

Accordingly, in a first aspect, the present invention provides an apparatus for feeding crimp terminals on a carrier strip into a crimping press, the separation between the terminals along the strip being the pitch of the strip, the apparatus comprising a feeding mechanism for displacing the carrier strip along a feed path;

an image capture means adapted to capture an image of a portion of the feed path; and, an image processing means connected to the image capture means and being adapted to (a) determine the position of at least one terminal on the feed path from the image;

(b) determine the pitch of the strip either from the image or from a pre-stored value; and, (c) calculate an alignment displacement of the strip along the feed path from the position and pitch such that a further terminal on the strip lies within a crimping zone on the feed path;

the image processing means being connected to the feeding mechanism and adapted to provide a control signal thereto such that the feeding mechanism displaces the carrier strip along the feed path by the alignment displacement.

The image processing means may determine the pitch from a pre-stored value.

Alternatively, the image processing means determines the pitch from the image.

The image capture means may comprise a line scan optical sensor.

The line scan optical sensor may capture an image along a line parallel to the feed path.

The line scan optical sensor may capture an image along a line inclined to the feed path.

The image capture means may comprise a camera adapted to capture an image of an area including a portion of the feed path.

The apparatus may include a plurality of image capture means.

In a further aspect of the invention there is provided an assembly comprising an apparatus according to the invention; and, a crimping press arranged to receive terminals from the apparatus and to crimp terminals in the crimping zone.

In a further aspect of the invention there is provided a method of feeding crimp terminals on a carrier strip into a crimping press along a feed path, the separation between the terminals along the strip being the pitch of the strip, the method comprising the steps of (a) providing a carrier strip;

(b) capturing an image of the carrier strip along a portion of the feed path;

(c) determining the position of at least one terminal on the feed path from the image;

(d) determining the pitch of the strip either from the image or from a pre-stored value;

(e) calculating an alignment displacement of the strip along a feed path from the position and pitch such that a further terminal along the strip lies within a crimping zone on the feed path;

(f) displacing the strip along the feed path by the alignment displacement.

The pitch can be determined from a pre-stored value.

The pitch can be determined from the image.

The method can further comprise the step of crimping the terminal in the crimping zone.

The image can be captured by at least one camera. The image can be captured by at least one optical line scanner.

Figure 2:
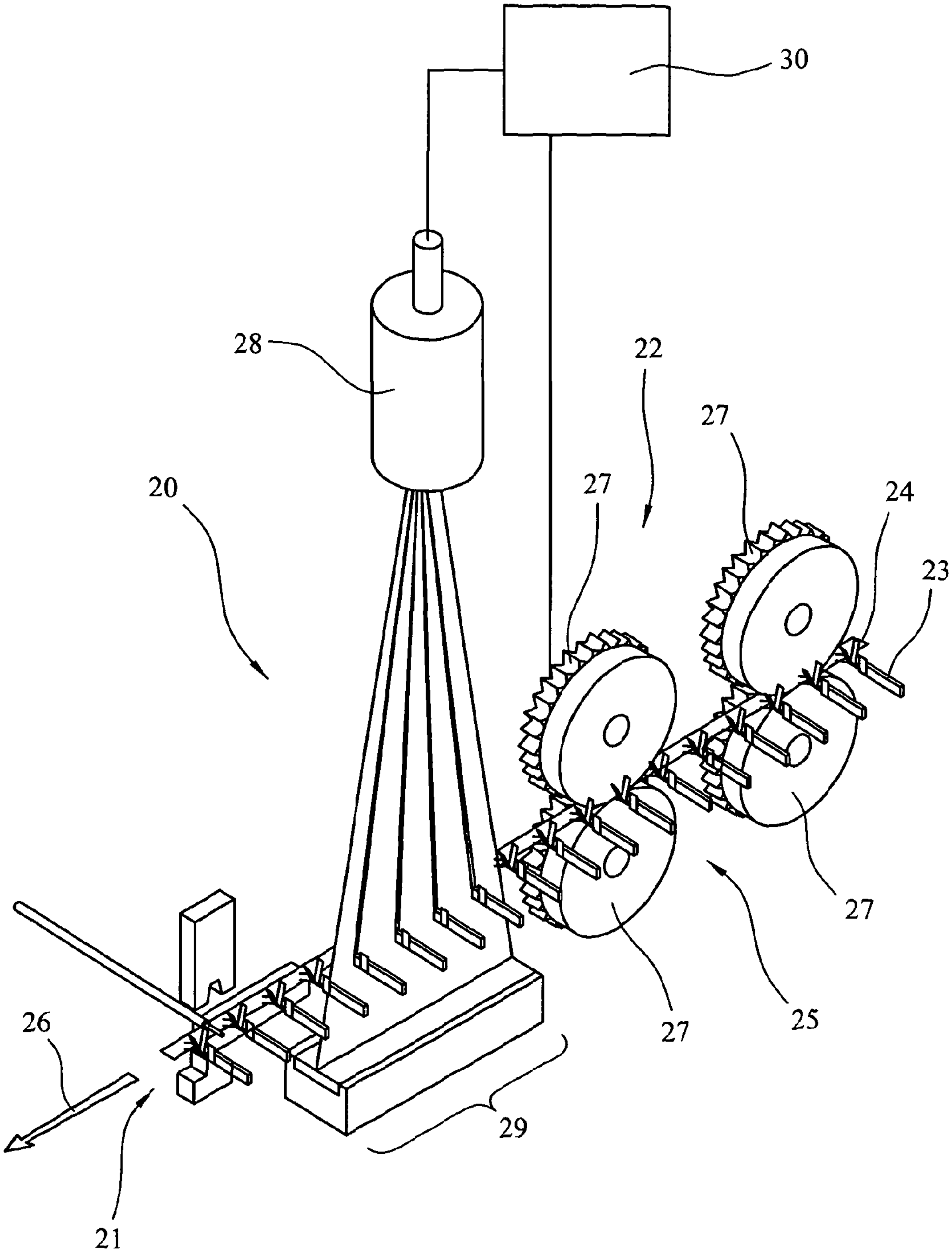
Figure 3:
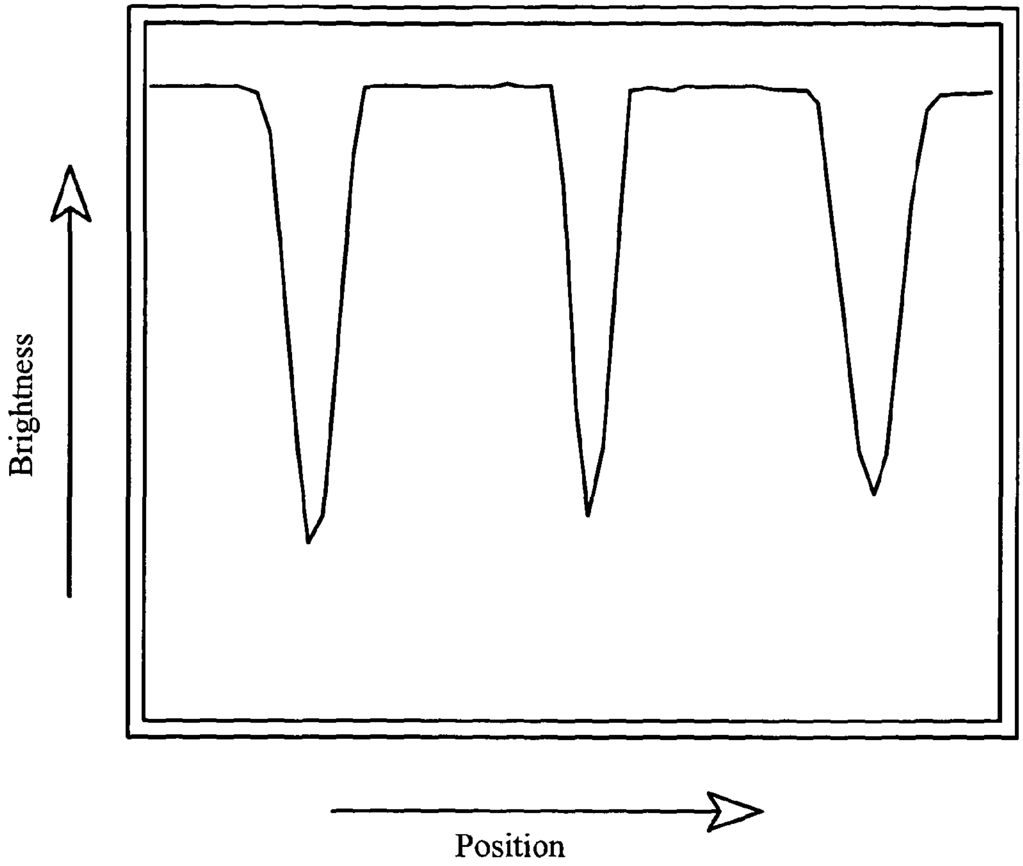

The present invention will now be described by way of example only and not in any limitative sense with reference to the accompanying drawings in which FIG. 1 shows, in schematic form, a crimping press and a known apparatus for feeding terminals into the crimping press;

FIG. 2 shows, in schematic form, an apparatus for feeding terminals on a carrier strip into a crimping press according to the invention, along with a crimping press; and, FIG. 3 shows an image captured by the image capture means along the feed path.

An important part of the industrial manufacture of electrical wiring assemblies is the automated crimping of electrical connecting terminals onto the ends of wires. The crimping process is usually carried out by a powered crimping press which is often a component of an automatic wire processing machine although sometimes the wire processing is done by a human operator working at a bench mounted press.

The terminals themselves are manufactured in a prior process by passing long strips of sheet metal through a sequence of punching and forming operations to convert them into long strips of terminals. For convenient handling the terminals are coiled onto reels, each reel containing a strip of several hundred or several thousand terminals. The spacing between the terminals on the strip is the pitch of the strip.

A known assembly 1 comprising a crimping press 2 and an apparatus 3 for feeding terminals 4 on a strip 5 into the press 2 is shown in FIG. 1. In use the feeding apparatus 3 provides a crimp terminal 4 onto a crimping anvil 6 in a crimping zone of the crimping press 2. The terminal 4 typically comprises a terminal body 7 in the plane of the strip 5 and two upstanding arms 8 forming a U shaped bucket therebetween. A prepared wire 9 is positioned in the bucket. A crimping fork 10 of the crimping press 2 is then driven down powerfully and precisely to fold the sides of the 'U' together around the wire 9 to press the terminal 4 and wire 9 together tightly. A cutting blade (not shown) cuts the terminal 4 free from the strip 5. The fork 10 is then lifted and the wire 9 removed along with its newly crimped-on terminal 4 and passed on for further processing. The carrier strip 5 is then fed forward along a feed path 11 by the feeding apparatus 3 until the next terminal 4 is arranged on the crimping anvil 6.

The most common type of feeding apparatus 3 for feeding and aligning the terminals 4 with the anvil 6 of the press 2 comprises a ratchet pawl. This is driven through an often complicated arrangement of spring loaded levers and cams by the stroking action of the press.

An alternative type of feeding apparatus (not shown) comprises a pair of motorised wheels which grip the carrier strip 5 and drive it precisely by an electric motor. The apparatus 3 further comprises a light beam sensor which detects when a terminal 4 on the strip 5 passes beneath it. If the light beam is correctly spaced from the crimping press 2 along the feed path 11 then, when one terminal 4 is beneath the light beam a further terminal 4 along the strip 5 is correctly arranged in the crimping zone where it is crimped to the wire 9 by the crimping press 2. Again, such a feeding apparatus 3 is only suitable for use with a strip 5 of one pitch. If one wishes to use a strip 5 of a different pitch then the spacing of the optical beam with respect to the crimping press 2 along the feed path 11 needs to be changed. Moving the beam each time one wishes to use a strip 5 of a different pitch is time consuming. It can also be difficult to achieve the required degree of accuracy in the relative alignment of a beam and crimping press 2.

Shown in FIG. 2 is an assembly 20 according to the invention. The assembly 20 comprises a crimping press 21 and an apparatus 22 for feeding crimp terminals 23 on a carrier strip 24 into the crimping press 21.

The apparatus 22 comprises a feeding mechanism 25 for feeding the carrier strip 24 along a feeding path 26 into the crimping press 21. In this embodiment the feeding mechanism 25 comprises motorised wheels 27 which grip the strip 24 as shown and which rotate to drive the strip 24 forward. For simplicity the motor which drives the wheels 27 is not shown.

The apparatus 22 further comprises an image capture means 28 which in this embodiment comprises an optical line scanner. The optical line scanner 28 captures an image along a portion 29 of the feed path 26 (in this case a line) as schematically shown. The line includes a plurality of the terminals 23 on the strip 24. The terminals 23 are back lit and the line scanner 28 measures the brightness along the line The image capture means 28 is connected to an image processing means 30. The image processing means 30 processes the image as will be described in detail below to determine an alignment displacement. The alignment displacement is the distance the strip 24 must be displaced along the feed path 26 such that a terminal 23 on the strip 24 lies within a crimping zone and so can be crimped by the crimping press 21.

The image processing means 30 is connected to the feeding mechanism 25. After having determined the alignment displacement the image processing means 30 provides a control signal to the feeding mechanism 25. In response the feeding mechanism 25 displaces the strip 24 by the alignment displacement such that a terminal 23 on the strip 24 is arranged in the crimping zone. As before a wire (not shown) is then arranged in the U of the terminal 23 and the crimping press 21 crimps the two together. The wire and its crimped terminal 23 is then removed.

In order to feed the next terminal 23 into the crimping press 21 the process is repeated. A further image of the strip 24 is captured, the alignment displacement is calculated and the strip 24 moved by the required alignment displacement. Because the line scanner 28 records the positions of the terminals 23 each time before the strip 24 is moved any errors which creep in, for example due to the drive wheels 27 slipping, are not cumulative.

Shown in FIG. 3 is the image captured by the optical line scanner 28. The brightness dips around the position of the terminals 23. The image processing means 30 performs a feature recognition algorithm on the image to determine the position of the terminals 23. The image processing means 30 reads a pre-stored value of the pitch of the strip 24 from memory. By knowing the position of the terminals 23 measured by the optical line scanner 28 and knowing the pitch of the strip 24, the image processing means 28 can determine the position of the terminal 23 closest to the crimping zone and hence its distance from the crimping zone. From this the alignment displacement can be determined.

In this embodiment the pitch is read from memory. Accordingly, as a minimum, the optical line scanner 30 need only record the position of one terminal 23. A more accurate determination of the position of the terminals 23 may be obtained if the image captured by the optical line scanner 28 includes the position of a plurality of terminals 23.

If the feeding apparatus 22 is to be used with a strip 24 of a different pitch then the new pitch can simply be stored in the memory of the image processing means 30. The image processing means 30 will use the new pitch when determining the alignment displacement. Alternatively, the image processing means 30 can be put into a learning mode. In this mode the image processing means 30 analyses one or more images recorded by the line scanner 28 and from these determines the pitch of the strip 24. This is then stored in memory for later use. This can be done in a number of different ways. If the image captured by the image capture means 28 includes a plurality of terminals 23 then the image processing means 30 can determine the pitch by determining the distance between two adjacent terminals 23. This could be done by determining the distance between two adjacent minima in the captured image. Alternatively it could be done by a more complex curve fitting operation. If only one terminal 23 is captured by the image capture means 30 then a different approach is possible. A first image is captured and stored. The strip 24 is then slowly moved forward and a further image stored. This is repeated until the further image matches the first image to within a predetermined degree of tolerance. Because of the repeating nature of the strip 24 the distance the strip 24 has moved is the pitch of the strip 24.

In an alternative embodiment of the invention the image processing means 30 determines the position of the terminals 23 and the pitch from each image before determining the alignment displacement. In this embodiment there is no need to place the image processing means 30 in a learning mode when the strip 24 is changed for one of a different pitch. The image processing means 30 automatically determines the different pitch and takes this into account when determining the alignment distance. This embodiment works best when the image capture means 28 captures the position of a plurality of terminals 23 so there is no need to move the strip 24 to determine its pitch.

In the above embodiment optical line scanner 28 measures along a line which is parallel to the feed path 26. In an alternative embodiment the optical line scanner 28 measures along a line which is slightly inclined to the feed path 26. The optical line scanner 28 therefore captures an image slice through each terminal 23 at a slightly different position along the terminal length depending on its position along the line on which the measurement is made. This provides additional information to the image processing means 30 to enable it to detect twisted, bent or otherwise misshapen terminals 23 and prevent them from being fed to the crimping press 21.

In an alternative embodiment of the invention (not shown) the image capture means 28 comprises a camera which captures a two dimensional image of the terminals 23 on the strip 24. The two dimensional nature of the image provides the image processing means 30 with additional information enabling it to detect malformed terminals 23 before they are provided to the crimping press 21.

In a further embodiment of the invention the feeding apparatus 22 comprises more than one optical capture means 28. With one optical capture means 28 it can be difficult to determine if one or more of the terminals 23 is bent out of the plane of the strip 24 towards the optical capture means 28. By use of a plurality of optical capture means 28 this can be determined. The second optical capture means 28 is typically inclined to the normal to the strip 24.

The invention claimed is:

1. An apparatus for feeding crimp terminals on a carrier strip into a crimping press, the separation between the terminals along the strip being the pitch of the strip, the apparatus comprising:

a feeding mechanism for displacing the carrier strip along a feed path;

an image capture means adapted to capture an image of a portion of the feed path; and, an image processing means connected to the image capture means and being adapted to (a) determine the position of at least one terminal on the feed path from the image;

(b) determine the pitch of the strip from at least one of the image and a pre-stored value; and, (c) calculate an alignment displacement of the strip along the feed path from the position n and pitch such that a further terminal on the strip lies within a crimping zone on the feed path;

the image processing means being connected to the feeding mechanism and adapted to provide a control signal thereto such that the feeding mechanism displaces the carrier strip along the feed path by the alignment displacement.

2. The apparatus as claimed in claim 1, wherein the image processing means determines the pitch from a pre-stored value.

3. The apparatus as claimed in claim 1, wherein the image processing means determines the pitch from the image.

4. The apparatus as claimed in claim 1, wherein the image capture means comprises a line scan optical sensor.

5. The apparatus as claimed in 4, wherein the line scan optical sensor captures an image along a line parallel to the feed path.

6. The apparatus as claimed in claim 4, wherein the line scan optical sensor captures an image along a line inclined to the feed path.

7. The apparatus as claimed in claim 1, wherein the image capture means comprises a camera adapted to capture an image of an area including a portion of the feed path.

8. The apparatus as claimed in claim 1, including a plurality of image capture means.

9. An assembly comprising:

an apparatus for feeding crimp terminals on a carrier strip into a crimping press, the separation between the terminals along the strip being the pitch of the strip, the apparatus comprising:

a feeding mechanism for displacing the carrier strip along a feed path;

an image capture means adapted to capture an image of a portion of the feed path; and, an image processing means connected to the image capture means and being adapted to (a) determine the position of at least one terminal on the feed path from the image;

(b) determine the pitch of the strip either from at least one of the image and a pre-stored value; and, (c) calculate an alignment displacement of the strip along the feed path from the position and pitch such that a further terminal on the strip lies within a crimping zone on the feed path;

the image processing means being connected to the feeding mechanism and adapted to provide a control signal thereto such that the feeding mechanism displaces the carrier strip along the feed path by the alignment displacement; and a crimping press arranged to receive terminals from the apparatus and to crimp terminals in the crimping zone.

10. The apparatus as claimed in claim 9, wherein the image processing means determines the pitch from a pre-stored value.

11. The assembly as claimed in claim 9, wherein the image processing means determines the pitch from the image.

12. The assembly as claimed in claim 9, wherein the image capture means comprises a line scan optical sensor.

13. The assembly as claimed in claim 9, wherein the image capture means comprises a camera adapted to capture an image of an area including a portion of the feed path.

14. The assembly as claimed in claim 9, including a plurality of image capture means.

* * * * *